(12) United States Patent
Yamamoto (10) Patent No.: US 8,857,548 B2
(45) Date of Patent: Oct. 14, 2014

(54) WORK VEHICLE

(75) Inventor: Toshihiro Yamamoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 52 days.

(21) Appl. No.: 13/807,795

(22) PCT Filed: Aug. 10, 2012

(86) PCT No.: PCT/JP2012/070453
§ 371 (c)(1),
(2), (4) Date: Dec. 31, 2012

(87) PCT Pub. No.: WO2014/016973
PCT Pub. Date: Jan. 30, 2014

(65) Prior Publication Data
US 2014/0190577 A1    Jul. 10, 2014

(30) Foreign Application Priority Data

Jul. 26, 2012  (JP) .................................. 2012-165757

(51) Int. Cl.
| F16L 35/00 | (2006.01) |
| E02F 9/08 | (2006.01) |
| F16L 3/23 | (2006.01) |
| B60K 11/04 | (2006.01) |

(52) U.S. Cl.
CPC ............... E02F 9/0866 (2013.01); B60K 11/04 (2013.01); F16L 3/23 (2013.01)
USPC ........................... 180/68.4; 138/106; 138/112

(58) Field of Classification Search
CPC ............... F16L 3/18; F16L 3/221; F16L 3/23; B60K 11/04
USPC ................. 180/68.1, 68.4; 138/106, 112, 113
See application file for complete search history.

(56) References Cited

U.S. PATENT DOCUMENTS

| 3,765,629 | A | * | 10/1973 | Voelker et al. ............... 248/74.4 |
| 3,860,978 | A | * | 1/1975 | Wirth ............................... 4/679 |
| 3,899,005 | A | * | 8/1975 | Klimpl .......................... 138/106 |
| 5,497,810 | A | * | 3/1996 | Berger et al. ................. 138/113 |
| 6,006,712 | A | * | 12/1999 | Suzuki ..................... 123/184.57 |
| 7,478,611 | B2 | * | 1/2009 | Yoshida ....................... 123/41.1 |
| 7,699,356 | B2 | * | 4/2010 | Bucher et al. ................. 285/321 |
| 8,047,328 | B1 | * | 11/2011 | Milewicz et al. ............. 181/246 |
| 8,245,733 | B2 | * | 8/2012 | Renaud .......................... 138/106 |
| 2007/0089407 | A1 | * | 4/2007 | Smith et al. ..................... 60/321 |
| 2010/0283278 | A1 | | 11/2010 | Mamada et al. |
| 2012/0138379 | A1 | | 6/2012 | Tsuji et al. |
| 2014/0053938 | A1 | * | 2/2014 | Persaud et al. ................ 138/106 |

FOREIGN PATENT DOCUMENTS

| EP | 2 311 681 A1 | 4/2011 |
| JP | 6-28227 | 4/1994 |
| JP | 8-14243 | 1/1996 |
| JP | 8-28266 | 1/1996 |

(Continued)

Primary Examiner — Jeffrey J Restifo
(74) Attorney, Agent, or Firm — Drinker Biddle & Reath LLP (57) ABSTRACT

A work vehicle (1) includes an engine (11), a cooling device (12), first and second hoses (14, 15), first and second flanges (16a, 17a), and a third flange (18a). The third flange (18a) is arranged to overlap with the first and second flanges (16a, 17a) by extending in a region R sandwiched between the first flange (16a) and the second flange (17a). Accordingly, there can be obtained a work vehicle (1) that can have rain water intruding inside prevented from entering the engine side along the hose.

9 Claims, 8 Drawing Sheets

(56) References Cited

FOREIGN PATENT DOCUMENTS

| JP | 2003-182380 | 7/2003 |
| JP | 2004-312927 | 11/2004 |
| JP | 2006-182275 | 7/2006 |
| JP | 2006-207247 | 8/2006 |
| JP | 2007-22533 | 2/2007 |
| JP | 2009-93903 | 4/2009 |
| JP | 2011-137378 | 7/2011 |

\* cited by examiner

WORK VEHICLE

TECHNICAL FIELD

The present invention relates to work vehicles, particularly a work vehicle including a partition arranged between an engine and a cooling device.

BACKGROUND ART

Some work vehicles have an engine and a cooling device connected by a plurality of hoses. Japanese Patent Laying-Open No. 2003-182380 (PTL 1) discloses a configuration in which a CAC (Charged Air Cooling) hose and a radiator hose are connected to the engine.

CITATION LIST

Patent Literature

PTL 1: Japanese Patent Laying-Open No. 2003-182380

SUMMARY OF INVENTION

Technical Problem

The configuration disclosed in the aforementioned publication had the problem that rain water intruding inside enters the engine side by running along the CAC hose and radiator hose.

In view of this problem, an object of the present invention is to provide a work vehicle that can prevent rain water intruding inside from entering the engine side along a hose.

Solution to Problem

A work vehicle of the present invention includes an engine, a cooling device, first and second hoses, first and second flanges, and a third flange. The first and second hoses are arranged between the engine and the cooling device for connection therebetween. The first and second flanges are formed at an outer circumferential face of the first hose to protrude outward of the first hose, and arranged spaced apart from each other. The third flange is formed at an outer circumferential face of the second hose to protrude outward of the second hose. The third flange is arranged to overlap with the first and second flanges by extending in a region sandwiched between the first flange and second flange.

According to the work vehicle of the present invention, the third flange is arranged to overlap with the first and second flanges by extending in a region sandwiched between the first flange and the second flange. Therefore, the first to third flanges can prevent the rain water intruding inside from entering the engine side along the first and second hoses. Further, the provision of the first and second flanges at the first hose and the provision of the third flange at the second hose allows the first hose and the second hose to be connected to the engine individually. Accordingly, connection of the first hose and second hose to the engine can be facilitated.

In the work vehicle set forth above, a partition having a first through hole is arranged between the engine and the cooling device. The first hose and the second hose pass through the first through hole in the partition. Therefore, the engine and cooling device can be connected at the shortest distance without the first and second hoses having to avoid the partition.

In the work vehicle set forth above, each of the first to third flanges tilts downwards from the partition side towards the cooling device side. Any rain water adhering to the first to third flanges will flow towards the cooling device. Accordingly, the rain water adhering to the first to third flanges can be prevented from running to the engine side.

In the work vehicle set forth above, the partition further includes a bracket at the cooling device side. The bracket includes a second through hole at the upper portion. Therefore, the first to third flanges can be arranged facing upwards.

In the work vehicle set forth above, the first to third flanges are provided such that a projection shape of the first to third flanges from a mutually overlapping direction covers the second through hole entirely. Accordingly, the intrusion of the rain water passing through the second through hole from between the rims of the first to third flanges and the second through hole to enter the engine can be prevented.

In the work vehicle set forth above, each of the first to third flanges has a circular outer shape. When viewed from a mutually overlapping direction, each of the first and second flanges overlaps with the third flange by a length greater than or equal to half a width of each relevant flange. Therefore, the overlapping area between the first flange and the third flange and the overlapping area between the second flange and the third flange can be ensured sufficiently. Thus, intrusion of rain water from between the first flange and the third flange and from between the second flange and the third flange into the engine side can be prevented reliably.

In the work vehicle set forth above, the first flange and the second flange are arranged spaced apart from each other in the longitudinal direction of the first hose. The third flange arranged between the first and second flanges is spaced apart from the first flange in the longitudinal direction of the second hose, and spaced apart from the second flange in the longitudinal direction of the second hose. The first and second flanges are spaced apart from the second hose in a radial direction. The third flange is spaced apart from the first hose in a radial direction. Therefore, accumulation of rain water at the first to third flanges can be prevented.

The work vehicle set forth above further includes a top panel arranged above the engine, the cooling device, and the partition. The top panel has a vent provided above the first and second hoses at the cooling device side relative to the partition. Accordingly, the first to third flanges prevent the rain water running in from the vent located above the first and second hoses from entering the engine side along the first and second hoses.

In the work vehicle set forth above, the elements in each of the first to third flanges are formed integrally as each of first to third protruding members. Accordingly, the assembly is facilitated.

Advantageous Effects of Invention

According the present invention set forth above, there can be provided a work vehicle that can prevent rain water intruding inside from entering the engine side along a hose.

DESCRIPTION OF EMBODIMENTS

Embodiments of the present invention will be described hereinafter with reference to the drawings.

First, a configuration of a work vehicle according to an embodiment of the present invention will be described. Description based on a wheel loader that is an example of a work vehicle to which the concept of the present invention can be applied will be provided.

Figure 1:
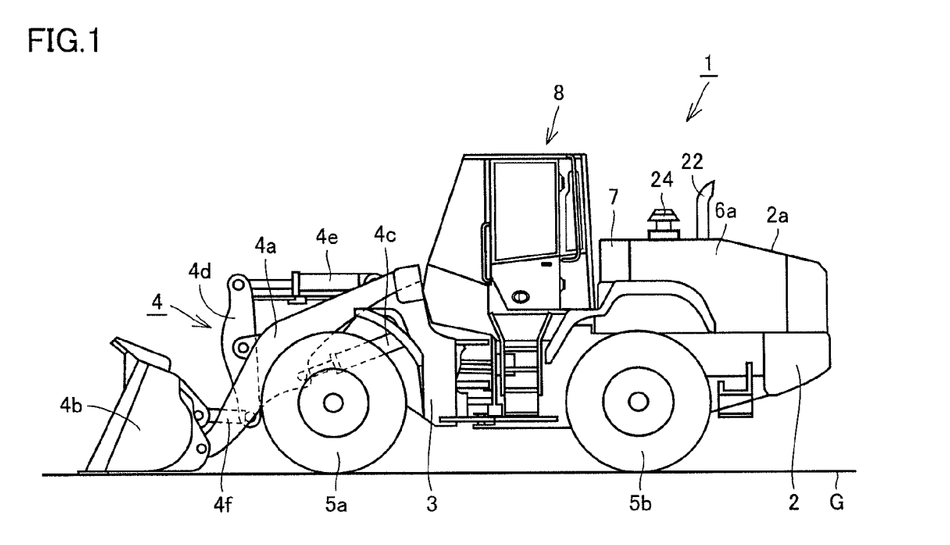
FIG. 1 is a side view schematically representing a configuration of a wheel loader according to an embodiment of the present invention.

Referring to FIG. 1, a wheel loader 1 of the present embodiment mainly includes a rear body 2, a front body 3, and work machinery 4. Each of the sides of front body 3 has a front wheel 5a attached. Each of the sides of rear body 2 has a rear wheel 5b attached.

Rear body 2 and front body 3 are attached horizontally swingable by a center pin (not shown) to constitute an articulate structure. Specifically, rear body 2 and front body 3 are coupled by left and right steering cylinders (not shown) constituting a pair. The left and right steering cylinders are configured to elongate and contract such that rear body 2 and front body 3 sway left and right about the center pin for steering. Rear body 2 and front body 3 constitute the body part of wheel loader 1.

Work machinery 4 is attached in front of front body 3. Work machinery 4 includes a boom 4a attached to front body 3 with its proximal end swingable, and a bucket 4b attached to the leading end of boom 4a in a swingable manner. Front body 3 is attached to boom 4a by a pair of boom cylinders 4c, 4c, and configured such that boom 4a sways by boom cylinders 4c, 4c elongating and contracting.

Work machinery 4 includes a bell crank 4d supported swingably by boom 4a at substantially the central region, a bucket cylinder 4e coupling the proximal end of bell crank 4d with front body 3, and a link 4f coupling the leading end of bell crank 4d with bucket 4b. The elongation and contraction of bucket cylinder 4e causes bucket 4b to sway.

An engine room 6a is arranged at the back of rear body 2. A hydraulic oil tank 7 is arranged in front of engine room 6a. A cab 8 where the operator enters to operate wheel loader 1 is located in front of hydraulic oil tank 7. The front and back as well as the left and right of wheel loader 1 are based on the operator sitting in cab 8 as the reference. A top panel 2a is arranged at the top face of rear body 2. Top panel 2a is located above engine room 6a in the state where wheel loader 1 is situated on a horizontal ground G.

Figure 2:
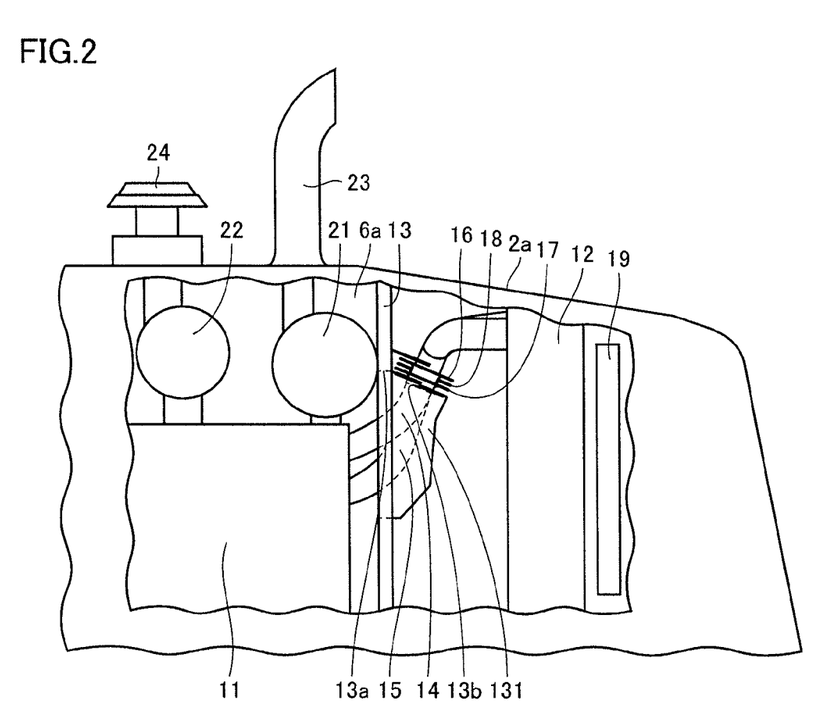
FIG. 2 is a partial broken away side view schematically representing a configuration in the neighborhood of an engine and cooling device according to an embodiment of the present invention.
Figure 3:
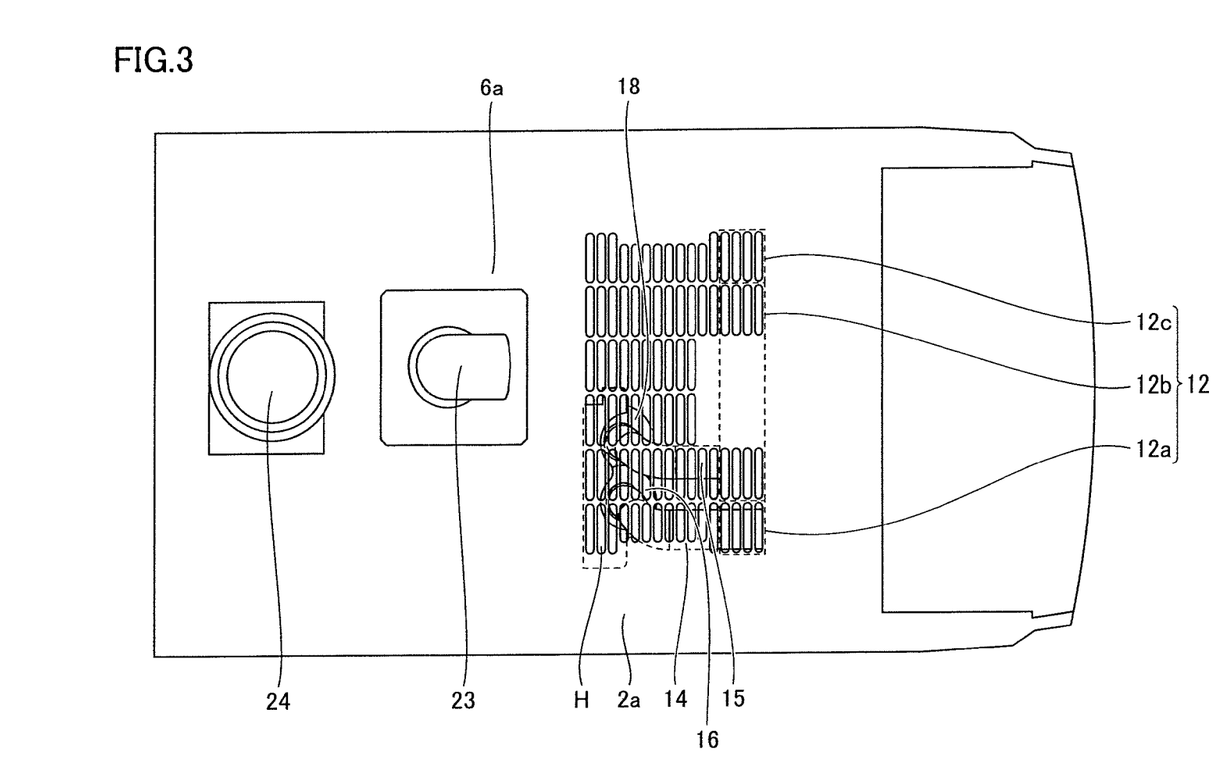
FIG. 3 is a top view schematically representing a configuration in the neighborhood of a vent in a top panel according to an embodiment of the present invention.

Referring to FIGS. 2 and 3, an engine 11 and a cooling device 12 are arranged in engine room 6a. Cooling device 12 includes a CAC device 12a, a radiator (engine coolant cooling device) 12b, and an oil cooler (hydraulic oil cooling device) 12c. CAC device 12a, radiator 12b and oil cooler 12c are arranged in line at the back of engine room 6a.

Engine room 6a is divided by a partition 13. Partition 13 is arranged between engine 11 and cooling device 12. Partition 13 includes a first through hole 13a. CAC hose (first hose) 14 and a radiator hose (second hose) 15 pass through first through hole 13a to connect engine 11 with cooling device 12. Specifically, CAC hose 14 passes through first through hole 13a to connect engine 11 with CAC device 12a. Radiator hose 15 passes through first through hole 13a to connect engine 11 with radiator 12b. A hydraulic oil hose not shown is connected to oil cooler 12c. Top panel 2a is arranged above engine 11, cooling device 12 and partition 13.

Top panel 2a includes a vent H provided above CAC hose 14 and radiator hose 15 at the side of cooling device 12 relative to partition 13. A plurality of vents H are formed.

In the proximity of partition 13 are attached a first protruding member 16 including a flange and a second protruding member 17 including a flange at CAC hose 14. A third protruding member 18 having a flange is attached at radiator hose 15. A plurality of vents H are arranged above first to third protruding members 16-18.

In engine room 6a, an exhaust system filter (DPF: diesel particulate filter) 21 and an intake system filter 22 are arranged. Each of exhaust system filter 21 and intake system filter 22 is connected to engine 11. Exhaust system filter 21 is connected to an exhaust pipe 23 arranged above top panel 2a. Intake system filter 22 is connected to an air cleaner 24 arranged above top panel 2a. Furthermore, a cooling fan 19 is arranged behind cooling device 12.

Figure 4:
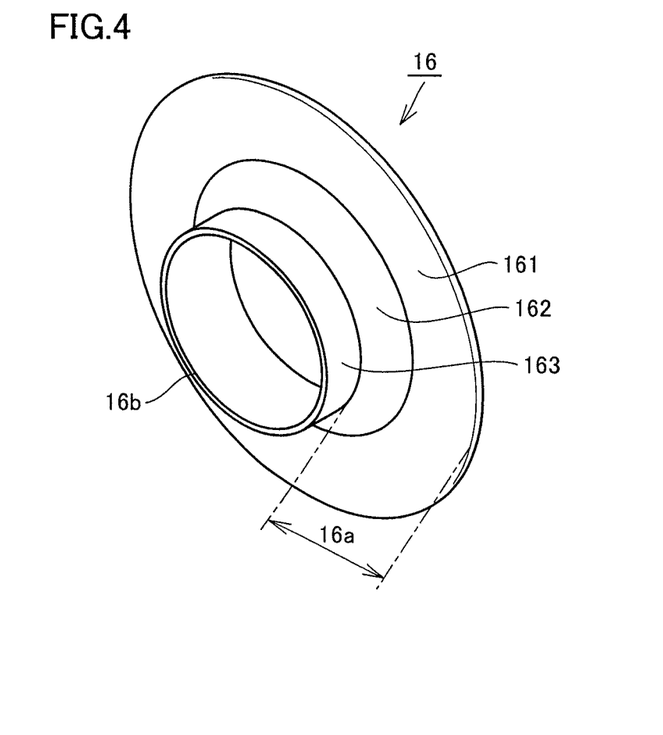
FIG. 4 is a perspective view schematically representing a configuration of a first protruding member according to an embodiment of the present invention.

Referring mainly to FIG. 4, a configuration of first to third protruding members 16-18 will be described in detail.

Referring to FIG. 4, a configuration of first protruding member 16 and second protruding member 17 will be described. Since first and second protruding members 16 and 17 have a similar configuration, the configuration of first protruding member 16 will be described representative thereof. The configuration of second protruding member 17 will not be described repeatedly, unless noted otherwise.

First protruding member 16 includes a flat section 161, a taper section 162, and a cylindrical section 163. Flat section 161 is arranged at the outer circumferential end of first protruding member 16. Flat section 161 has a disk shape. Taper section 162 is located between flat section 161 and cylindrical section 163. Taper section 162 is inclined such that the diameter becomes smaller towards cylindrical section 163. Cylindrical section 163 protrudes in a direction where the diameter of taper section 162 becomes smaller than flat section 161. Cylindrical section 163 takes a cylindrical shape. Flat section 161 and the portion of taper section 162 in the radial direction constitute first flange 16a. First protruding member 16 has an insert hole 16b at the central area.

The elements in each of first to third flanges 16a-18a may be formed integrally as each of protruding members 16-18.

Third protruding member 18 has a similar configuration except that its cylindrical section is longer than the cylindrical section of first and second protruding members 16 and 17. First to third protruding members 16-18 may be formed of rubber, resin, or the like.

The state where first and second protruding members 16 and 17 are attached to CAC hose 14 and third protruding member 18 is attached to radiator hose 15 will be described hereinafter with reference to FIGS. 5-8.

Figure 5:
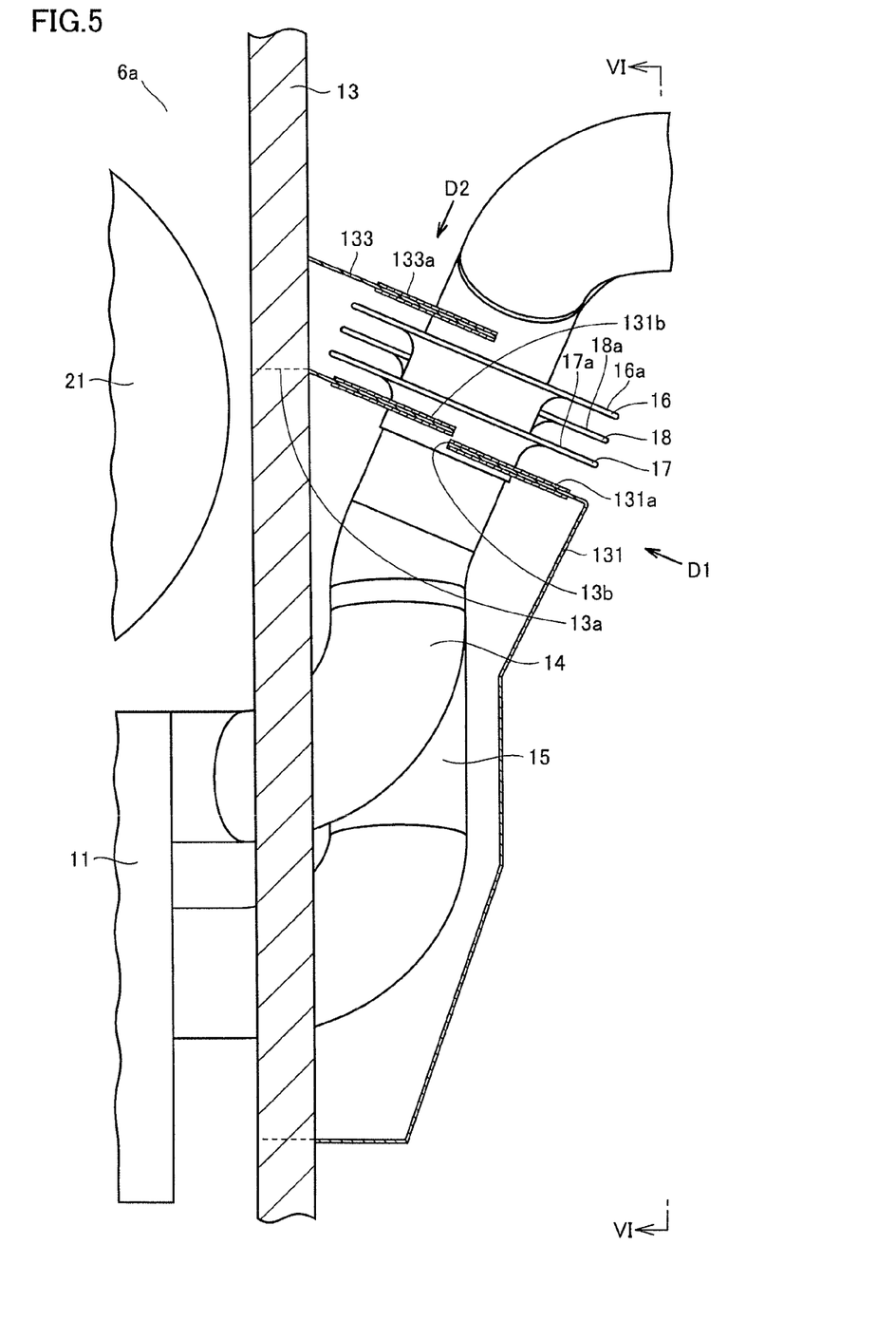
FIG. 5 is a partial broken away side view showing in enlargement a configuration in the neighborhood of a partition of FIG. 2.
Figure 6:
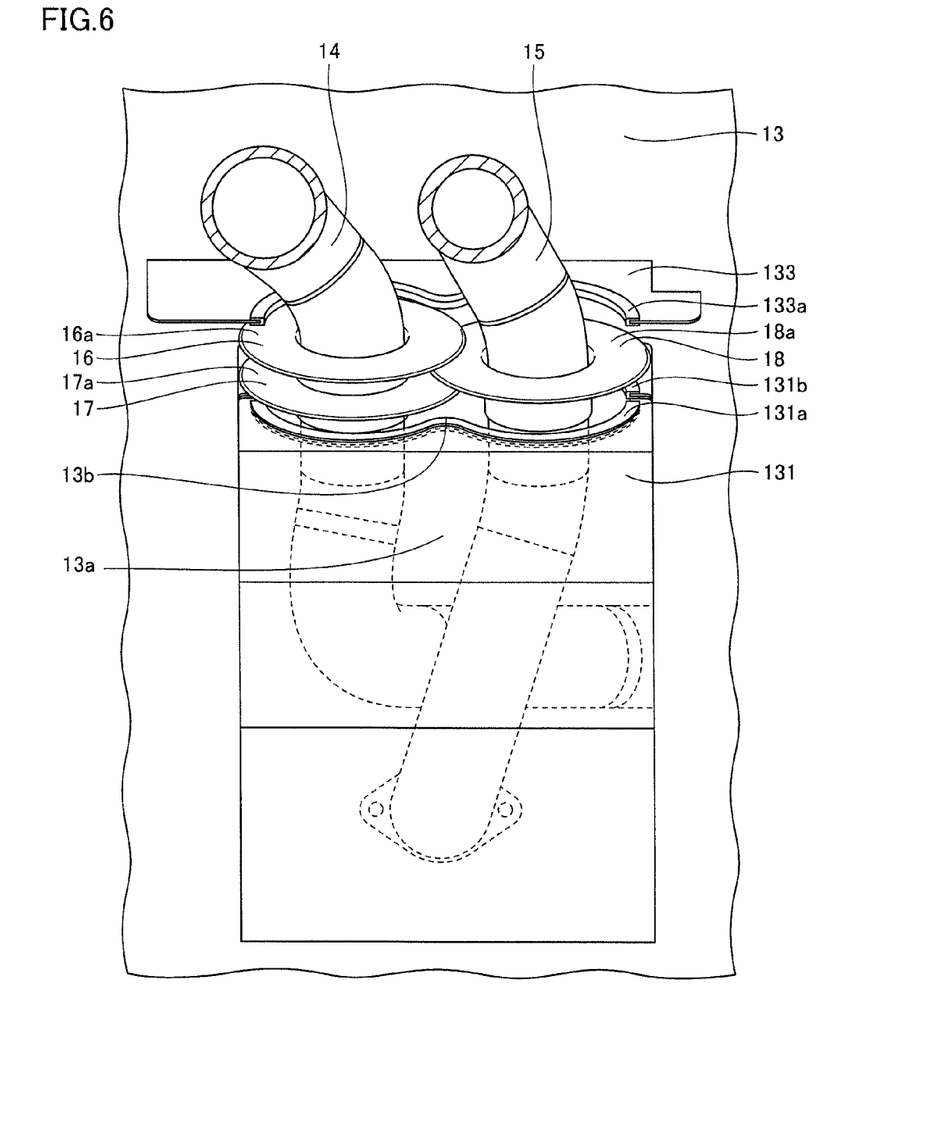
FIG. 6 is a sectional view taken along line VI-VI of FIG. 5.

Referring to FIGS. 5 and 6, a bracket 131 and a cover 133 are attached to partition 13. Bracket 131 protrudes from partition 13 towards the side of cooling device 12. For the purpose of CAC hose 14 and radiator hose 15 to communicate with engine 11, a first through hole 13a is formed at partition 13 and a second through hole 13b is formed at bracket 131 at an upper portion. Protection members 131a and 131b are attached at the perimeter of second through hole 13b at bracket 131.

CAC hose 14 having first and second protruding members 16 and 17 attached and radiator hose 15 having third protruding member 18 attached run along the inner side of bracket 131 from second through hole 13b to be connected to engine 11.

Above second through hole 13b are located first to third flanges 16a-18b of first to third protruding members 16-18. First flange 16a and second flange 17a are arranged spaced apart from partition 13 at the side of cooling device 12 (refer to FIG. 2). First flange 16a and second flange 17a are formed at the outer circumferential face of CAC hose 14 so as to protrude outward of CAC hose 14. First flange 16a and second flange 17a are arranged spaced apart from each other in the longitudinal direction of CAC hose 14.

Third flange 18a is arranged spaced apart from partition 13 at the side of cooling device 12. Third flange 18a is formed at the outer circumferential face of radiator hose 15 so as to protrude outward of radiator hose 15.

Each of first to third flanges 16a-18a tilts downwards from the partition 13 side towards the cooling device 12 side.

A cover 133 is provided above third flange 18a at the partition 13 side. Cover 133 has a curved section arranged at the outer side of CAC hose 14 and radiator hose 15. A protection member 133a is attached to this curved section.

Figure 7:
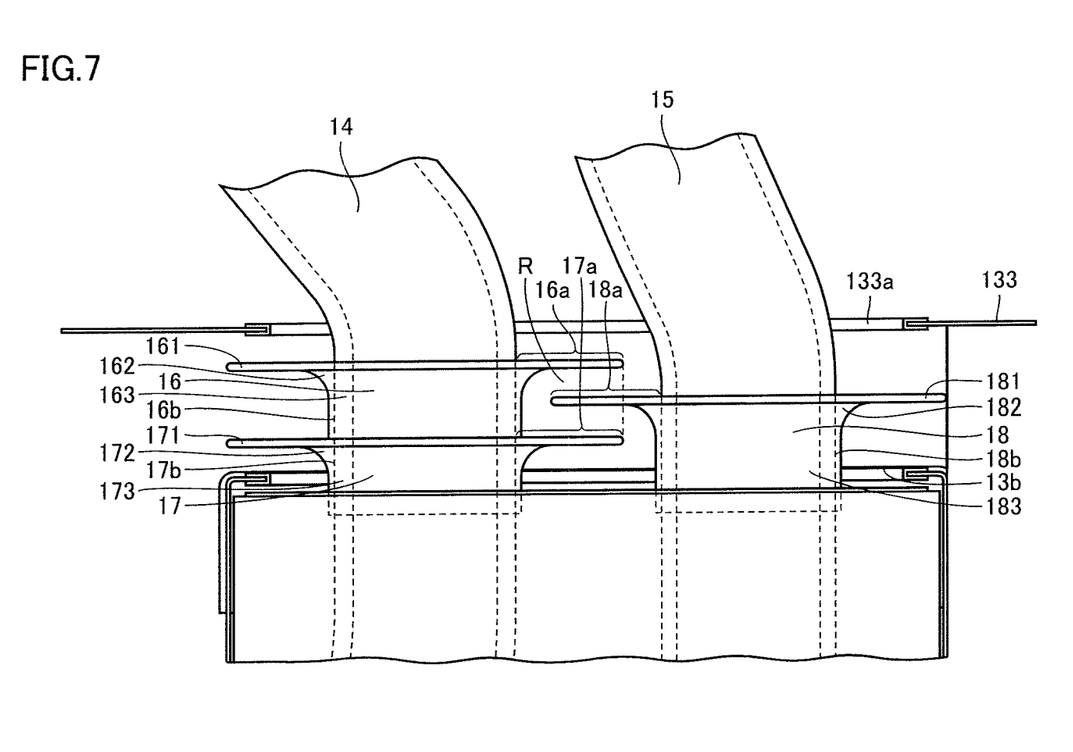
FIG. 7 schematically represents a configuration in the neighborhood of first to third flanges viewed from the first end side of the first to third flanges according to an embodiment of the present invention.

Referring to FIG. 7, CAC hose 14 is inserted into through hole 16b of first protruding member 16 and through hole 17b of second protruding member 17 to be press-bonded. There is no gap between first and second protruding members 16 and 17 and CAC hose 14. Furthermore, radiator hose 15 is inserted into through hole 18b of third protruding member 18 to be press-bonded. There is no gap between third protruding member 18 and radiator hose 15. Accordingly, the running of rain water from through hole 16b of first protruding member 16, through hole 17b of second protruding member 17, and through hole 18b of third protruding member 18 towards the inner side of second through hole 13b of partition 13 can be prevented.

Third flange 18a is arranged to overlap with first flange 16a and second flange 17a by extending in a region R sandwiched between first flange 16a and second flange 17a. In the present embodiment, first flange 16a and second flange 17a are arranged in parallel. Third flange 18a is arranged parallel to first flange 16a and second flange 17a. First to third flanges 16a-18a are arranged parallel to the opening of second through hole 13b.

Figure 8:
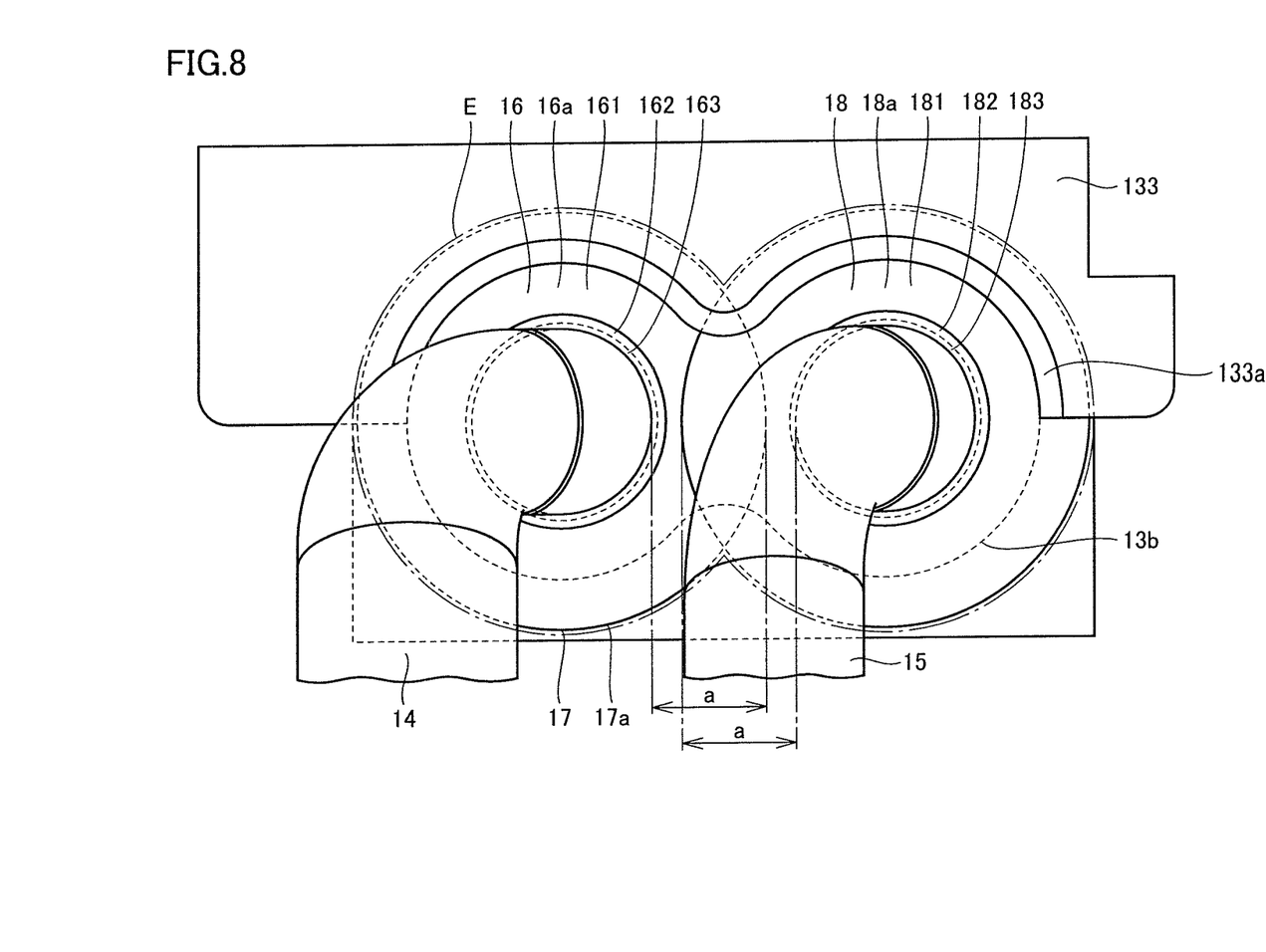
FIG. 8 schematically represents a configuration in the neighborhood of first to third flanges viewed from the surface side of the first to third flanges according to an embodiment of the present invention.

FIG. 7 is a view from the direction of arrow D1 in FIG. 5. FIG. 8 is a view from the direction of arrow D2 in FIG. 5. Referring to FIGS. 7 and 8, first to third flanges 16a-18a are provided such that a projection shape E of first to third flanges 16a-18a from a mutually overlapping direction (hereinafter, referred to as "projection shape") covers second through hole 13b entirely. Shape E corresponding to the projection of first to third flanges 16a-18a from a direction where they overlap each other covers the opening of second through hole 13b entirely. Projection shape E in FIG. 8 is indicated more slightly at the outer side than the actual projection shape for the sake of facilitating observation.

First to third flanges 16a-18a each have a circular outer shape. Viewing from the direction where the flanges overlap with each other, each of first and second flanges 16a and 17a overlap with third flange 18a by a length greater than or equal to half a dimension corresponding to the dimension in the radial direction minus the radius of the hose (the dimension of the flange alone). Further, first flange 16a and second flange 17a are arranged spaced apart from each other in the longitudinal direction of CAC hose 14. Third flange 18a arranged between first and second flanges 16a and 17a has a predetermined distance in the longitudinal direction of the hose from each of first and second flanges 16a and 17a. First and second flanges 16a and 17a are spaced apart from radiator hose 15, i.e. do not form contact with radiator hose 15. Third flange 18a is spaced apart from CAC hose 14, i.e. does not form contact with CAC hose 14. First protruding member 16 and second flange 17a may be formed unitary.

A functional advantage of the present embodiment will be described hereinafter.

At wheel loader 1 of the present embodiment as shown in FIG. 7, third flange 18a is arranged to overlap with first flange 16a and second flange 17a by extending in a region R sandwiched between first flange 16a and second flange 17a. Therefore, first to third flanges 16a-18a serve to prevent rain water running inside from entering the engine 11 side (refer to FIG. 2) along the first and second hoses. First flange 16a and second flange 17a are attached to CAC hose 14, whereas third flange 18a is attached to radiator hose 15. In other words, first to third flanges 16a-18a are attached individually to CAC hose 14 and radiator hose 15. Therefore, CAC hose 14 and radiator hose 15 can be connected individually with engine 11. Accordingly, the connection of CAC hose 14 and radiator hose 15 with engine 11 can be facilitated.

At wheel loader 1 of the present embodiment as shown in FIG. 5, CAC hose 14 and radiator hose 15 passed through first through hole 13a in partition 13. Therefore, CAC hose 14 and radiator hose 15 can connect engine 11 with cooling device 12 at the shortest distance without the need to avoid partition 13.

At wheel loader 1 of the present embodiment as shown in FIG. 5, each of first to third flanges 16a-18a of first to third protruding members 16-18 tilts downwards from the side of partition 13 to the side of cooling device 12 (refer to FIG. 2). Therefore, rain water adhering to first to third flanges 16a-18a run to the side of cooling device 12. Accordingly, rain water adhering to first to third flanges 16a-18a can be prevented from running towards the side of engine 11.

At wheel loader 1 of the present embodiment, bracket 131 includes a second through hole 13b at the upper portion. Therefore, first to third flanges 16a-18a can be arranged facing upwards.

At wheel loader 1 of the present embodiment as shown in FIG. 8, first to third flanges 16a-18a are provided such that a projection shape E of first to third flanges 16a-18a from a mutually overlapping direction covers second through hole 13b entirely. Accordingly, the intrusion of the rain water passing through second through hole 13b from between the rims of first to third flanges 16a-18a and the second through hole 13b to enter the engine 11 side (refer to FIG. 5) can be prevented.

At wheel loader 1 of the present embodiment as shown in FIG. 8, each of first and second flanges 16a and 17a overlaps with third flange 18a by a length greater than or equal to half the width of each flange, when viewed from the mutually overlapping direction. Therefore, the overlapping area between first flange 16a and third flange 18a and the overlapping area between second flange 17a and third flange 18a can be ensured reliably. Accordingly, the intrusion of rain water from between first flange 16a and third flange 18a and from between second flange 17a and third flange 18a into the engine 11 side (refer to FIG. 2) can be prevented more reliably.

At wheel loader 1 of the present embodiment, third flange 18a is spaced apart from first flange 16a in the longitudinal direction of the second hose, and spaced apart from second flange 17a in the longitudinal direction of radiator hose 15. First and second flanges 16a and 17a are spaced apart from radiator hose 15 in the radial direction, and third flange 18a is spaced apart from CAC hose 14 in the radial direction. Accordingly, accumulation of rain water at the first to third flanges can be prevented.

At wheel loader 1 of the present embodiment as shown in FIG. 3, top panel 2a includes a vent H provided above CAC hose 14 and radiator hose 15 at the side of cooling device 12 relative to partition 13. Therefore, first to third flanges 16a-18a serve to prevent the rain water running in through vent H provided above CAC hose 14 and radiator hose 15 from entering the engine 11 side (refer to FIG. 2) along CAC hose 14 and radiator hose 15.

Wheel loader 1 of the present embodiment is formed integrally with protruding members 16-18, respectively. Therefore, the assembly is facilitated.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

INDUSTRIAL APPLICABILITY

The present invention may be applied particularly advantageously to a work vehicle including a partition arranged between an engine and a cooling device.

REFERENCE SIGNS LIST 1 wheel loader; 2 rear body; 2a top panel; 3 front body; 4 work machinery; 5a front wheel; 5b rear wheel; 6a engine room; 7 hydraulic oil tank; 8 cab; 11 engine; 12 cooling device; 12a CAC device; 12b radiator (engine coolant cooling device); 12c oil cooler (hydraulic oil cooling device); 13 partition; 13a first through hole; 13b second through hole; 14 CAC hose; 15 radiator hose; 16-18 first-third protruding member; 16a-18a first-third flange; 19 cooling fan; 21 exhaust system filter; 22 intake system filter; 23 exhaust pipe; 24 air cleaner; 131 bracket; 133 cover; 161, 171, 181 flat section; 162, 172, 182 taper section; 163, 173, 183 cylindrical section; E projection shape; E1 first end; E2 second end; G ground; H vent

The invention claimed is:

1. A work vehicle comprising:
an engine;
a cooling device;
first and second hoses arranged between said engine and said cooling device for connecting said engine and said cooling device;
first and second flanges formed at an outer circumferential face of said first hose to protrude outward of said first hose, and arranged spaced apart from each other; and
a third flange formed at an outer circumferential face of said second hose to protrude outward of said second hose,
said third flange arranged to overlap with said first and second flanges by extending in a region sandwiched between said first flange and said second flange.

2. The work vehicle according to claim 1, wherein
a partition having a first through hole is arranged between said engine and said cooling device, and
said first hose and said second hose pass through said first through hole in the partition.

3. The work vehicle according to claim 2, wherein each of said first to third flanges tilts downwards from said partition side towards said cooling device side.

4. The work vehicle according to claim 2, wherein
said partition further includes a bracket at said cooling device side, and
said bracket includes a second through hole at an upper portion.

5. The work vehicle according to claim 4, wherein said first to third flanges are provided such that a projection shape of said first to third flanges from a mutually overlapping direction covers said second through hole entirely.

6. The work vehicle according to claim 2, further comprising a top panel arranged above said engine, said cooling device, and said partition,
wherein said top panel has a vent provided above said first and second hoses at said cooling device side relative to said partition.

7. The work vehicle according to claim 1, wherein
each of said first to third flanges has a circular outer shape, and
each of said first and second flanges overlaps with said third flange by a length greater than or equal to half a width of each relevant flange, when viewed from a mutually overlapping direction.

8. The work vehicle according to claim 1, wherein
said first flange and said second flange are arranged spaced apart from each other in a longitudinal direction of said first hose,
said third flange arranged between said first and second flanges is spaced apart from said first flange in a longitudinal direction of said second hose, and spaced apart from said second flange in a longitudinal direction of said second hose,
said first and second flanges are spaced apart from said second hose in a radial direction, and
said third flange is spaced apart from said first hose in a radial direction.

9. The work vehicle according to claim 1, wherein elements in each of said first to third flanges are formed integrally as each of first to third protruding members.

* * * * *